(12) United States Patent
Cooper et al.

(10) Patent No.: US 8,091,388 B2
(45) Date of Patent: Jan. 10, 2012

(54) COOLING RING FOR USE IN MANUFACTURING OF FIBERGLASS WOOL

(75) Inventors: William R. Cooper, Johnstown, OH (US); Scott J. Blackwood, Whitesburg, GA (US); David L. Shallenberger, Newark, OH (US); Michael P. Lewis, Newark, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 565 days.

(21) Appl. No.: 11/647,011

(22) Filed: Dec. 28, 2006

(65) Prior Publication Data

US 2008/0156041 A1 Jul. 3, 2008

(51) Int. Cl.
*C03B 37/085* (2006.01)
*C03B 37/06* (2006.01)
(52) U.S. Cl. ............... 65/525; 65/518; 65/524; 65/526; 65/517
(58) Field of Classification Search ............ 65/510–513; 239/132–132.5
See application file for complete search history.

(56) References Cited

U.S. PATENT DOCUMENTS

| | | | |
|---|---|---|---|
| 2,632,287 A | 3/1953 | Phillips | |
| 3,019,476 A | 2/1962 | Rawlinson et al. | |
| 3,392,779 A | 7/1968 | Tilbrook | |
| 3,759,681 A | 9/1973 | Russell | |
| 3,775,074 A | 11/1973 | Russell | |
| 3,838,997 A * | 10/1974 | Becker et al. | 65/29.19 |
| 3,877,911 A * | 4/1975 | Borst | 65/451 |
| 3,901,675 A | 8/1975 | Buchanan et al. | |
| 3,902,878 A * | 9/1975 | Hoag et al. | 65/447 |
| 3,986,853 A | 10/1976 | Coggin, Jr. et al. | |
| 4,003,731 A | 1/1977 | Thompson | |
| 4,049,412 A | 9/1977 | Dent, Jr. et al. | |
| 4,071,339 A | 1/1978 | Griffiths | |
| 4,071,340 A | 1/1978 | Melle | |

(Continued)

FOREIGN PATENT DOCUMENTS

CN 1121571 A 5/1996

OTHER PUBLICATIONS

Sparying systems co, ispray catalog, vee-jet nozzle Dec. 19, 2003.*

(Continued)

*Primary Examiner* — Matthew Daniels
*Assistant Examiner* — Jodi Cohen
(74) *Attorney, Agent, or Firm* — MacMillan, Sobanski & Todd, LLC

(57) ABSTRACT

The present invention provides improved cooling of a veil of glass fibers by using a combination of nozzle assemblies. The nozzle assemblies include air caps of differing configurations to control the penetration of the spray into the veil. One suitable spray configuration is a nozzle assembly having punch air cap that creates a narrow exit angle, high velocity flow of droplets to penetrate the veil to cool the fibers at the interior. Another suitable configuration is a nozzle assembly having a flat air cap that creates a wide exit angle, low velocity, dispersed spray pattern to cool the exterior of the veil. Preferably, the flat air cap creates a very fine particle size to increase the cooling efficiency of the spray. By using the cooling ring of the present invention, lower levels of binder to be applied to the fibers and environmental emissions from the plant may be reduced.

19 Claims, 6 Drawing Sheets

U.S. PATENT DOCUMENTS

| | | |
|---|---|---|
| 4,071,341 A | 1/1978 | Bohy et al. |
| 4,071,342 A | 1/1978 | Schaefer et al. |
| 4,141,709 A | 2/1979 | Reese |
| 4,194,895 A | 3/1980 | Thompson |
| 4,202,680 A | 5/1980 | Thompson |
| 4,227,906 A | 10/1980 | Rieser |
| 4,230,471 A | 10/1980 | Levecque et al. |
| 4,256,477 A | 3/1981 | Moody |
| 4,311,500 A | 1/1982 | Roberson et al. |
| 4,349,364 A | 9/1982 | Morrison |
| 4,362,541 A | 12/1982 | Thompson |
| 4,363,645 A | 12/1982 | Eisenberg |
| 4,662,922 A | 5/1987 | Hill et al. |
| 4,765,390 A * | 8/1988 | Vaterlaus ................. 164/486 |
| 4,822,392 A * | 4/1989 | Fachat et al. ................. 65/525 |
| 4,824,457 A | 4/1989 | Jensen |
| 4,886,536 A | 12/1989 | Lewin |
| 4,995,892 A | 2/1991 | Garret et al. |
| 5,382,306 A * | 1/1995 | Plata et al. ................. 148/511 |
| 5,617,997 A | 4/1997 | Kobayashi et al. |
| 6,192,714 B1 | 2/2001 | Dowlati et al. |
| 6,338,259 B1 * | 1/2002 | Yang ................. 65/513 |
| 2002/0100296 A1 * | 8/2002 | Oh et al. ................. 65/510 |
| 2002/0129624 A1 * | 9/2002 | Gao et al. ................. 65/430 |
| 2004/0207102 A1 * | 10/2004 | Sugimori et al. ................. 261/112.1 |

OTHER PUBLICATIONS

Steinen nozzles, Industrial spray nozzles, mistjet nozzle technical information, Nov. 10, 2006.*

International Search Report dated May 20, 2008 in PCT/US2007/026304.

Chinese Search Report Communication, Application No. 0780048483.0, Date Dec. 21, 2007.

* cited by examiner

COOLING RING FOR USE IN MANUFACTURING OF FIBERGLASS WOOL

TECHNICAL FIELD AND INDUSTRIAL APPLICABILITY OF THE INVENTION

The present invention relates to the manufacture of fibrous insulation, particularly fiberglass insulation. The present invention provides improved cooling of a veil of glass fibers during the manufacturing process. By using a combination of nozzle assemblies, the cooling ring of the present invention provides cooling of fibers on the interior of the veil as well as fibers on the exterior of the veil. The cooling ring of the present invention may also include nozzle assemblies that create very fine droplets that markedly reduce the heat within the veil. The cooler veil allows for lower levels of binder to be applied to the fibers and reduces environmental emissions.

BACKGROUND OF THE INVENTION

In the manufacture of fiberglass insulation molten glass is fiberized with a spinner to form a veil of glass fibers the fibers are cooled with a spray of water and then are coated with a liquid binder, such as a urea-formaldehyde or polyacrylic acid binder. The binder is susceptible to evaporation or pre-curing when applied to glass fibers that are too hot. Evaporation of the binder is undesirable because it increases the raw material cost of the insulation and may create undesirable environmental emissions. Precuring of the binder is undesirable because it reduces the surface quality of the insulation and may reduce the R-value of the insulation.

The spray rings of the prior art cool did not have the ability to effectively cool the exterior of the veil of glass fibers while effectively cooling the fibers at the interior of the veil. This resulted in warm fibers that may cause evaporation and pre-cure of the binder. Thus, an improved cooling ring that reduces the temperature gradient across the veil of fibers by cooling the interior of the veil is sought.

SUMMARY OF THE INVENTION

The present invention provides improved cooling of a veil of glass fibers by using a combination of nozzle assemblies. The nozzle assemblies include air caps of differing configurations to control the penetration of the spray into the veil. One suitable spray configuration is a nozzle assembly having a punch spray air cap that creates a high velocity flow of droplets to penetrate the veil to cool the fibers at the interior. Another suitable nozzle assembly configuration is a nozzle assembly having a flat air cap that creates a low velocity, dispersed spray pattern to cool the exterior of the veil. Preferably, the nozzle assembly having a flat air cap creates a very fine particle size to increase the cooling efficiency of the spray. By using the cooling ring of the present invention, lower levels of binder to be applied to the fibers and environmental emissions from the plant may be reduced.

DETAILED DESCRIPTION AND PREFERRED EMBODIMENTS OF THE INVENTION

The present invention provides improved cooling of a veil of glass fibers by using a combination of nozzle assemblies. The nozzle assemblies include air caps of differing configurations to control the penetration of the spray into the veil. One suitable spray configuration is a punch spray air cap that creates a high velocity flow of droplets to penetrate the veil to cool the fibers at the interior. Another suitable configuration is a flat air cap that creates a low velocity, dispersed spray pattern to cool the exterior of the veil. Preferably, the flat air cap creates a very fine particle size to increase the cooling efficiency of the spray. By using the cooling ring of the present invention lower levels of binder to be applied to the fibers and environmental emissions from the plant may be reduced.

Figure 1:
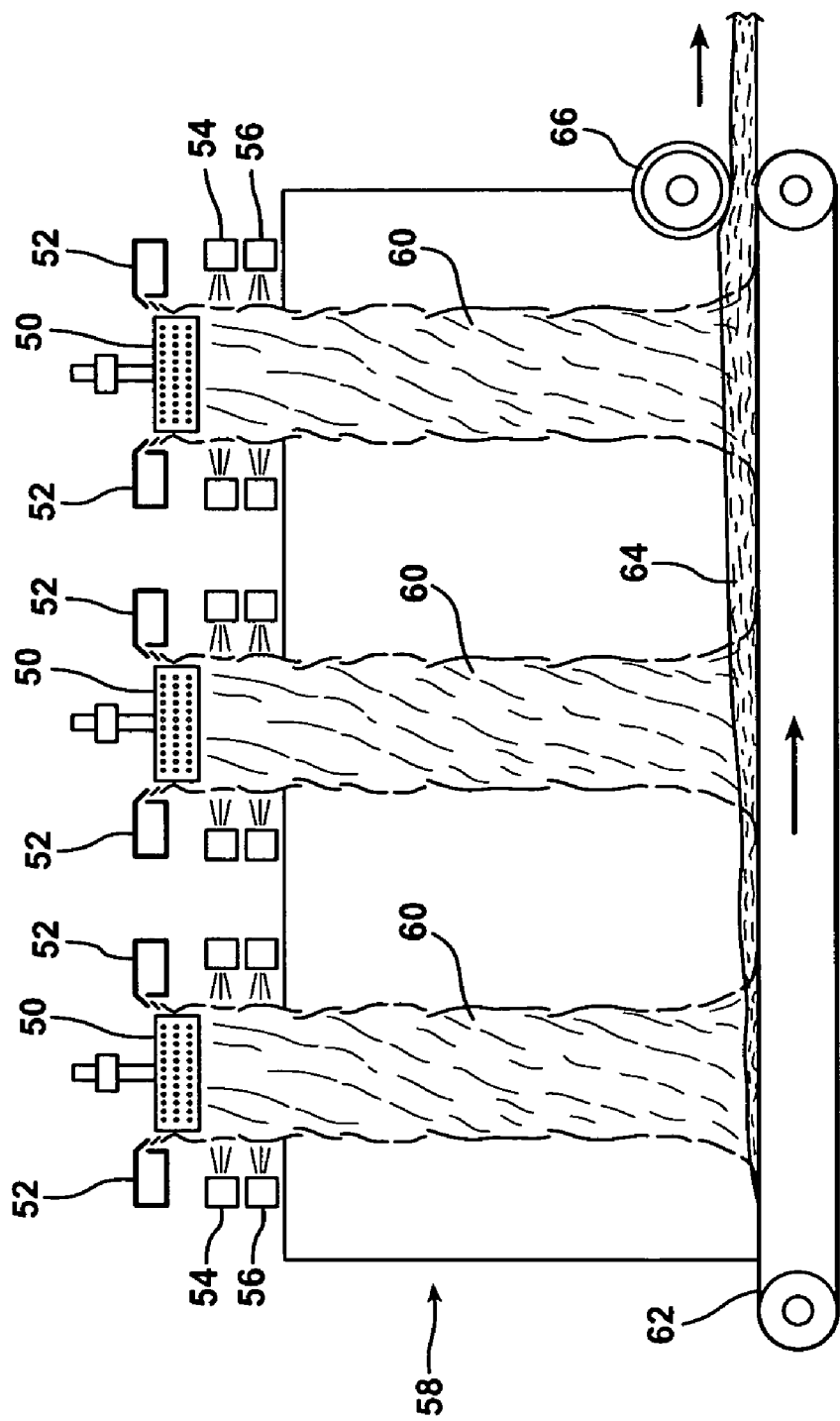
FIG. 1 is a plan view of a manufacturing line for producing fibrous insulation using the cooling ring of the present invention.

As shown in FIG. 1, a glass fiber manufacturing line including a fiber forming section 58. The forming section 58 includes a number of fiberizing spinners 50 that are supplied with a molten glass stream (not shown). The fiberizing spinners 50 are rotated at high speeds and the molten glass is forced to pass through holes in the circumferential sidewall of the spinners 50 to form fibers. Blowers 52 direct a gas stream in a substantially downward direction to impinge the fibers, turning them downward, attenuating the primary fibers to form a veil 60. Cooling ring 54 sprays fluid, such as water, on veil 60 to cool the fibers within the veil. Binder sprayers 56 spray binder onto the veil 60 that is deposited onto collection chain 62 where the fibers in veil 60 are collected into uncured pack 64. The uncured pack 64 exits the forming section 58 under exit roller 66 and enter a curing oven (not shown).

Figure 2A:
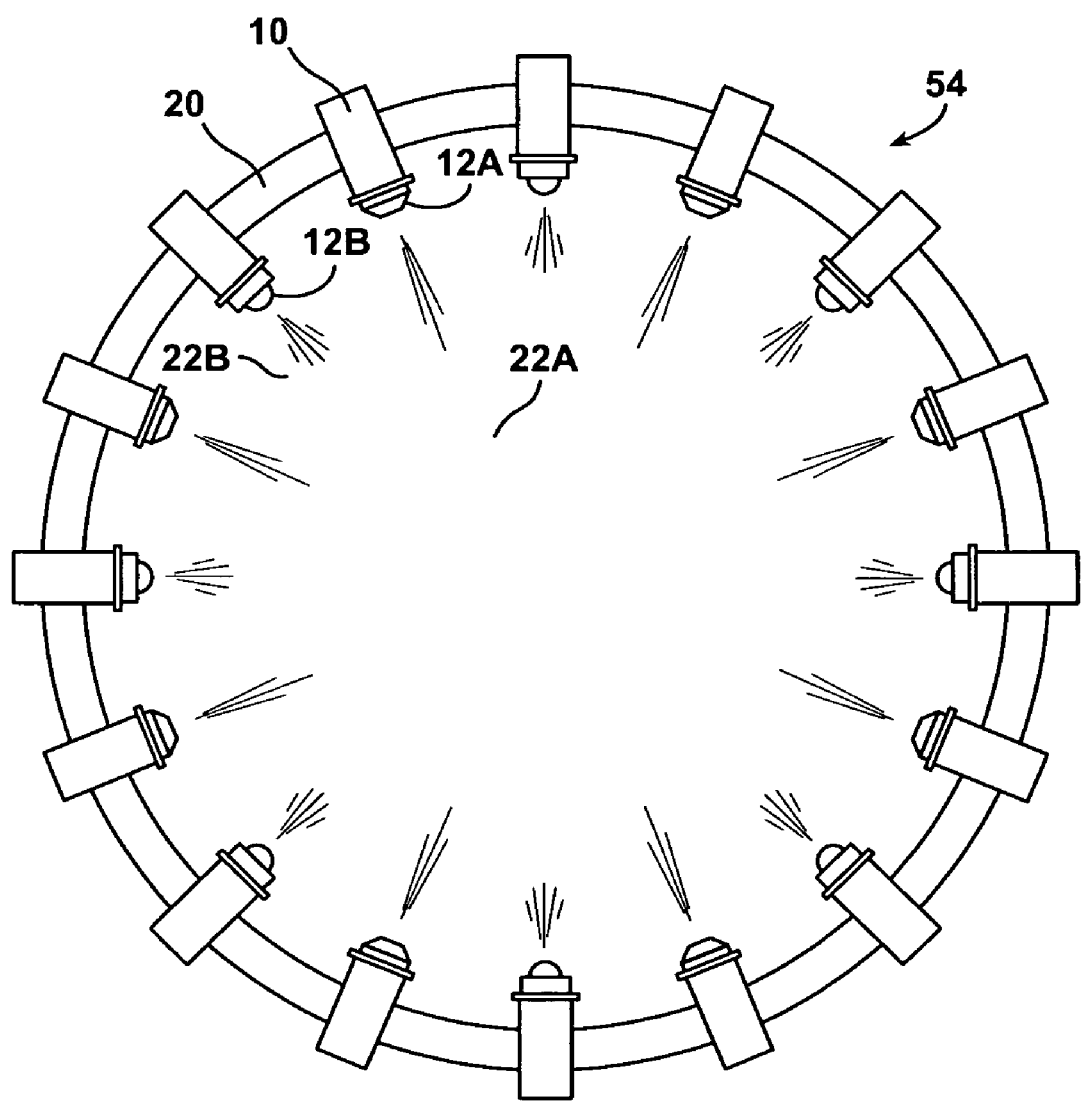
FIG. 2A is a plan view of a cooling ring of the present invention including eight nozzle assemblies having flat air caps and eight nozzle assemblies having punch spray air caps.
Figure 2B:
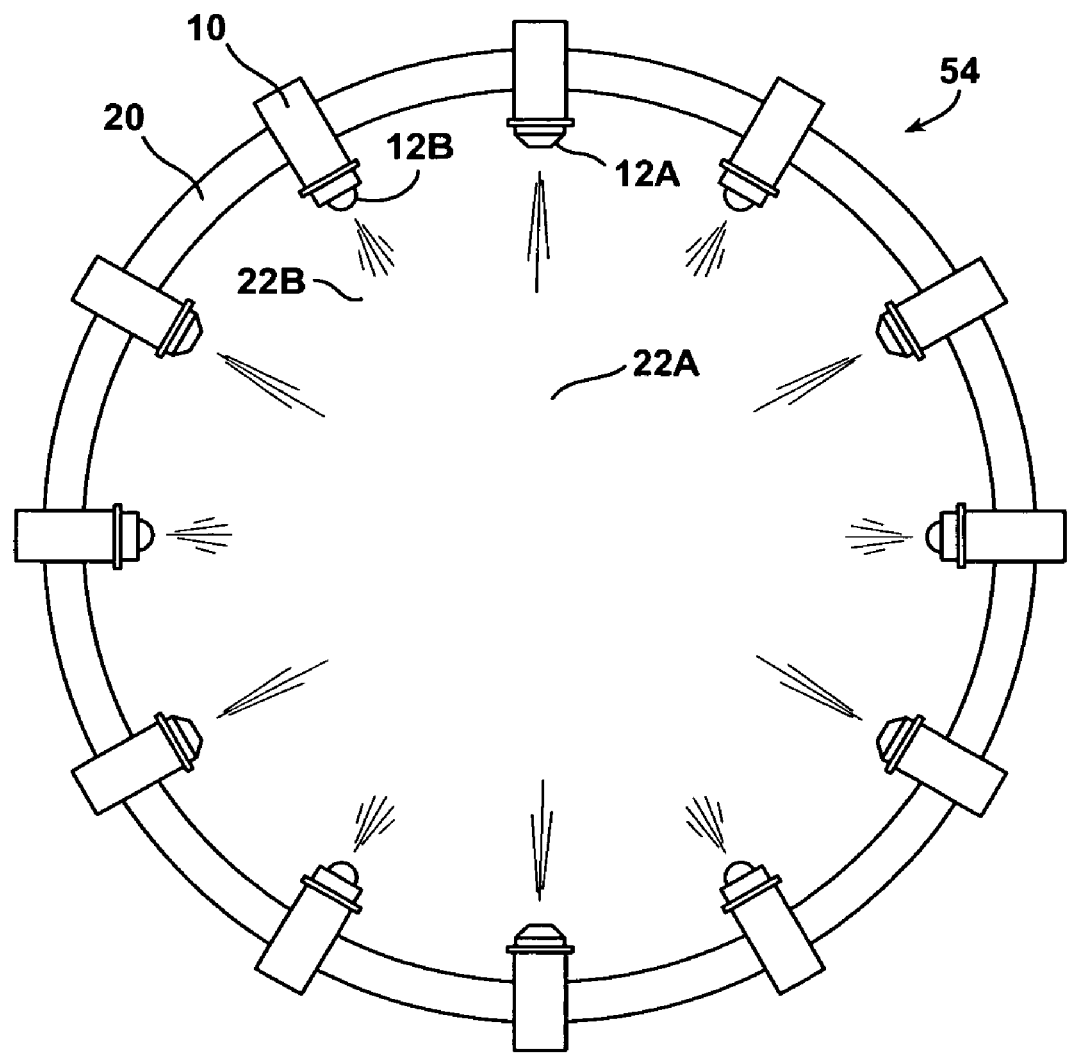
FIG. 2B is a plan view of a cooling ring of the present invention including six nozzle assemblies having flat air caps and six nozzle assemblies having punch spray air caps.
Figure 2C:
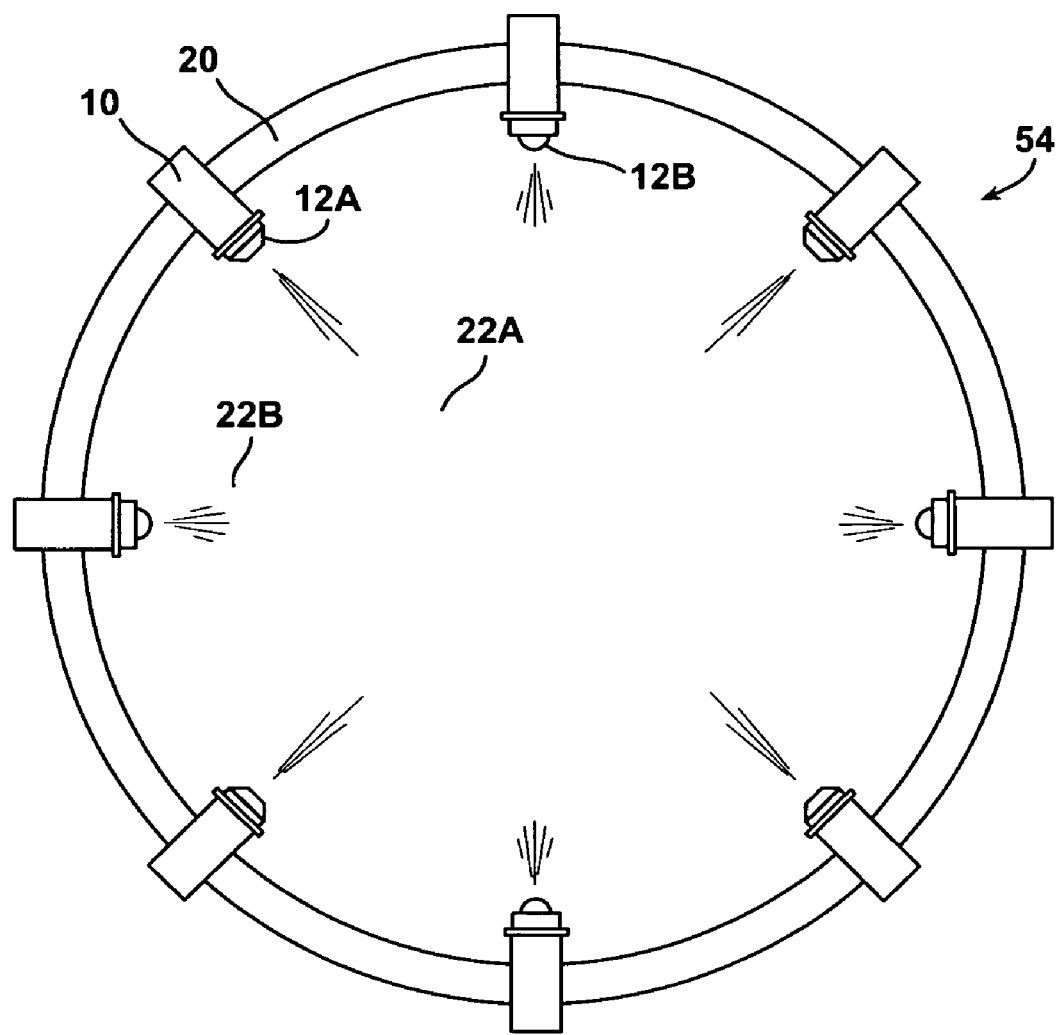
FIG. 2C is a plan view of a cooling ring of the present invention including four nozzle assemblies having flat air caps and four nozzle assemblies having punch spray air caps.

FIG. 2A-2C show spray rings of the present invention. The spray ring 54 includes spray nozzle assemblies 10 as well as pressurized air and liquid supplies (not shown). The spray ring includes alternating nozzle assemblies 10 having either punch spray air caps 12a or flat spray air caps 12b. The punch spray air caps 12a create a high-velocity directed spray 22b that penetrates veil 60 to cool the fibers within the veil. The flat spray air caps 12b create a low-velocity dispersed spray pattern 22b that cools the fibers at the periphery of veil 60.

Figure 3:
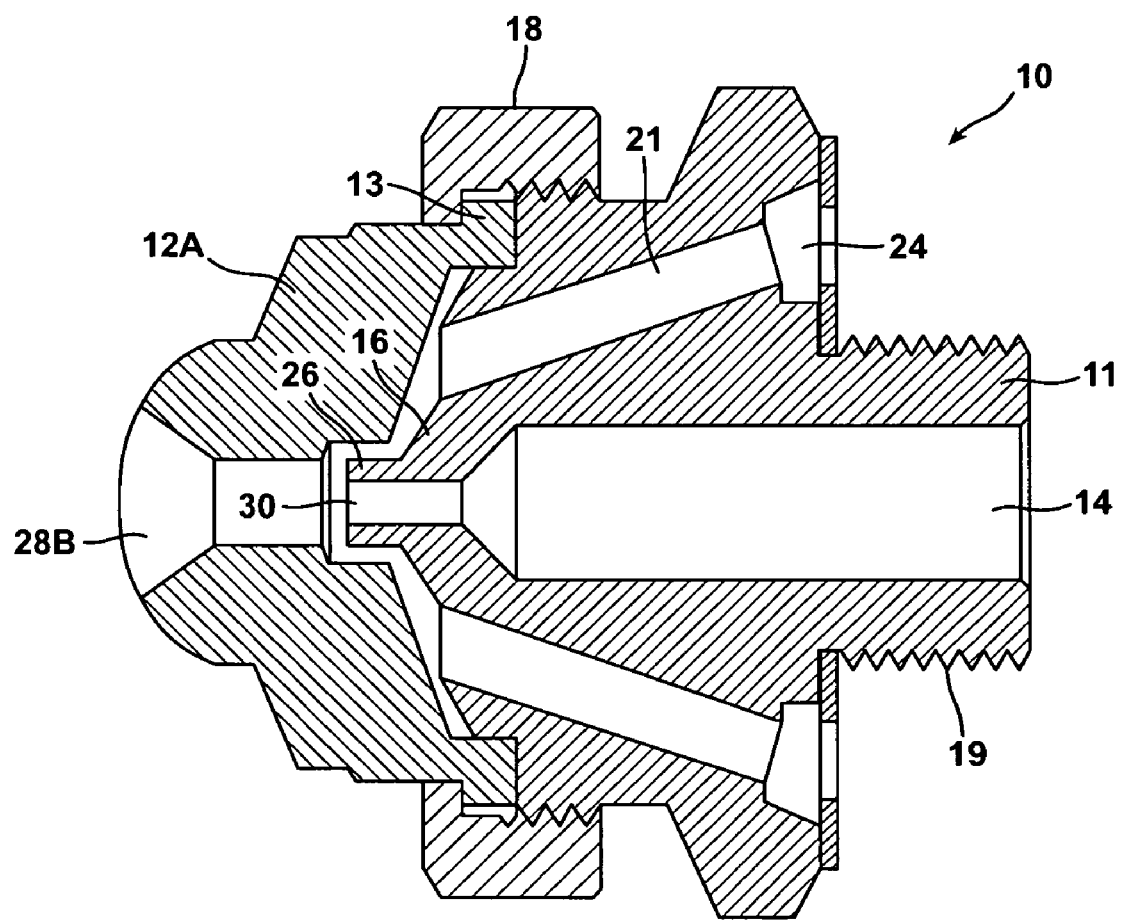
FIG. 3 is a cross-sectional view of a nozzle assembly having a flat air cap useful in the cooling ring of the present invention.

In FIG. 3 there is shown an illustrative external mix spray nozzle assembly 10 useful with the present invention. The spray nozzle assembly 10 includes a nozzle body 11 having a central liquid flow passage 14 with a liquid spray tip 16 at the discharge end thereof and an air cap 12a mounted surrounding the spray tip 16 of the nozzle body 11 by a retaining ring 18 on the shoulder 13 of the air cap. The nozzle body 11 may be affixed to the forward end of a base portion (not shown) by a threaded stem 19. The nozzle body 11 typically includes one or more pressurized air passages 21, which extend through nozzle body 11. Suitable supply lines can be coupled to the base portion liquid and gas passages 14, 24 for supplying pressurized streams of liquid and air to the nozzle body passages 30, 21, respectively. The spray tip 16 typically includes a nose portion 26 that extends axially into a central opening 28b of the air cap 12a. The spray tip 16 in this case has a central liquid flow passage 30 that communicates with the nozzle body passage 14. The nose portion 26 includes cylindrical passage that defines a liquid discharge orifice 30. The air cap 12a includes an open passage 28b that creates a low velocity spray pattern that disperses the spray 22b onto the periphery of veil 60.

Figure 4:
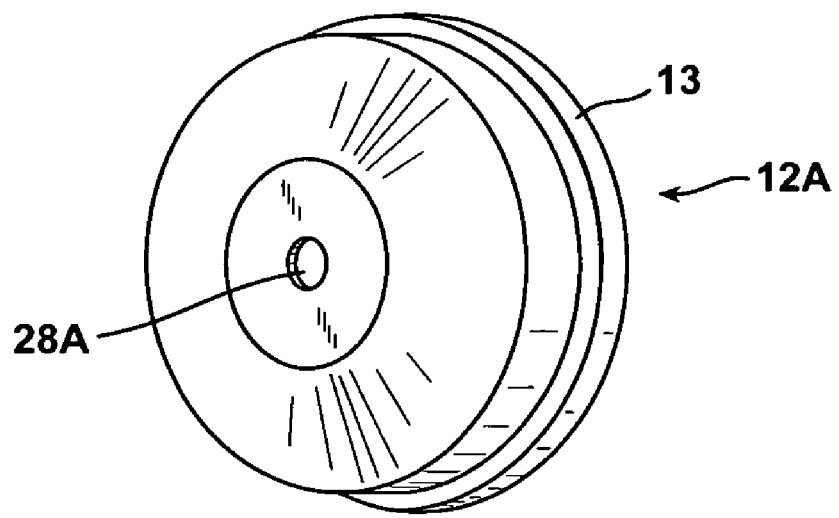
FIG. 4 is an isometric view of a punch spray air cap useful in the cooling ring of the present invention.

FIG. 4 shows a high velocity air cap 12a including shoulder 13 and a constricted central opening 28a. The air cap 12 is secured to the nozzle body 11 with a retaining ring 18 that engages shoulder 13. The air cap 12a has an exit angle of less than about 30° and preferably about 25°. This narrow exit angle provides a high velocity steam of water droplets that penetrate the veil 60 to cool the fibers at the interior.

Figure 5:
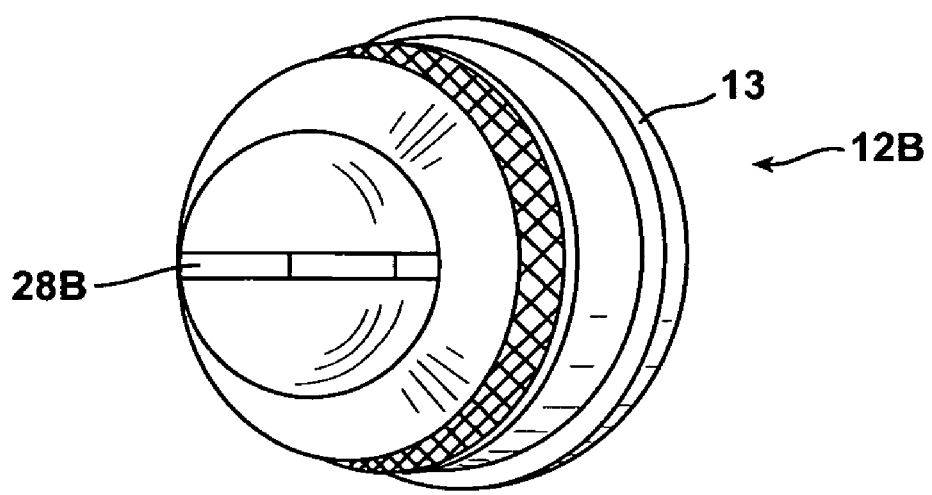
FIG. 5 is an isometric view of a flat air cap useful in the cooling ring of the present invention.

FIG. 5 shows a low velocity air cap 12b including shoulder 13 and an open central opening 28b. The air cap 12b is secured to the nozzle body 11 with a retaining ring 18 that engages shoulder 13. The air cap 12b has an exit angle of greater than about 100° and preferably about 160°. This wide exit angle provides a low velocity stream of water droplets that are dispersed about the circumference of the veil 60 to cool the fibers on the exterior.

By using the alternating punch spray and flat spray as discussed above on the cooling ring of the present invention the fibers of the veil are cooled in a manner superior to the cooling ring of the prior art. The use of the cooling ring of the present invention allows lower levels of binder to be applied to the fibers, improves the surface quality of the insulation, improves the insulative value of the insulation and reduces environmental emissions from the plant.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

We claim:

1. A cooling apparatus for use in the manufacture & glass fibers, comprising:
a plurality of spray heads mounted on a support; the plurality of spray heads comprising a first set of spray heads and second set of spray heads;
the first set of said spray heads having an exit angle of less than 30° which provide a narrow stream of cooling liquid; and
the second set of said spray heads having an exit angle of greater than 100° which simultaneously provide a dispersed stream of cooling fluid.

2. The cooling apparatus for use in the manufacture of glass fibers of claim 1, wherein said first set of spray heads and said second set of spray heads are arranged in an alternating arrangement on said support.

3. The cooling apparatus for use in the manufacture of glass fibers of claim 2, wherein the first set of spray heads and the second set of spray heads includes an equal number of spray heads.

4. The cooling apparatus for use in the manufacture of glass fibers of claim 2, wherein the first set of spray heads includes a nozzle body having a central liquid flow passage and an air cap having a circular orifice therethrough.

5. The cooling apparatus for use in the manufacture of glass fibers of claim 4, wherein the second set of spray heads includes a nozzle body having a central liquid flow passage and an air cap having a slotted orifice therethrough.

6. The cooling apparatus for use in the manufacture of glass fibers &claim 4, wherein the first set of spray heads has an exit angle of 25°.

7. The cooling apparatus for use in the manufacture of glass fibers of claim 5, wherein the second set of spray heads has an exit angle of 160°.

8. A manufacturing line for the manufacture of glass fiber insulation, comprising:
a forming area;
a collection chain within said forming area;
at least one spinner, said spinner being rotated to extrude glass fibers into a veil of glass fibers;
at least one cooling ring positioned directly below said at least one spinner, said cooling ring including a first plurality of spray tips that provide a narrow spray pattern to penetrate said veil of glass fibers and a second plurality of spray tips that provide a dispersed spray pattern that does not penetrate said veil of glass fibers,
wherein said first plurality of spray tips has an exit angle of less than 30° and said second plurality of spray tips has an exit angle of greater than 100°.

9. The manufacturing line for the manufacture of glass fiber insulation of claim 8, wherein the first plurality of spray tips and the second plurality of spray tips are arranged in an alternating arrangement on said support.

10. The manufacturing line for the manufacture of glass fiber insulation of claim 8, wherein the first plurality of spray tips and the second plurality of spray tips include an equal number of spray tips.

11. The manufacturing line for the manufacture of glass fiber insulation of claim 8, wherein the first plurality of spray tips have an exit angle of 25°.

12. The manufacturing line for the manufacture of glass fiber insulation of claim 8, wherein the second plurality of spray tips have an exit angle of 160°.

13. The manufacturing line for the manufacture of glass fiber insulation of claim 8, wherein the first plurality of spray tips includes a nozzle body having a central liquid flow passage and an air cap having a circular orifice therethrough, and the second plurality of spray tips includes a nozzle body having a central liquid flow passage and an air cap having a slotted orifice therethrough.

14. A cooling apparatus for use in the manufacture of glass fibers formed in a veil having an interior side and an exterior side, comprising:
a plurality of spray heads mounted on a support; the plurality of spray heads comprising a first set of spray heads and second set of spray heads;
a supply of a liquid;
a supply of compressed air;
the first set of said spray heads mounted on said support coupled to said air supply and said liquid supply to provide a first high velocity spray pattern that penetrates said veil of glass fibers to cool said glass fibers from said interior side of said veil; and
the second set of said spray heads mounted on said support coupled to said air supply and said liquid supply to provide a second low velocity non-penetrating spray pattern to cool said glass fibers from said exterior sides
wherein said first set of spray heads has a liquid exit angle of less than 30° and said second set of spray heads has a liquid exit angle of greater than 100°, and
wherein the first set of spray heads and the second set of spray heads are arranged in an alternating arrangement on said support.

15. The cooling apparatus for use in the manufacture of glass fibers of claim 14, wherein the first set of spray heads and the second set of spray heads includes an equal number of spray heads.

16. The cooling apparatus for use in the manufacture of glass fibers of claim 14, wherein the first set of spray heads has a liquid exit angle of 25°.

17. The cooling apparatus for use in the manufacture of glass fibers of claim 16, wherein the second set of spray heads has a liquid exit angle of 160°.

18. The cooling apparatus of claim 1, wherein said dispersed stream of cooling fluid does not penetrate said veil of glass fibers.

19. The cooling apparatus of claim 14, wherein said second set of spray heads simultaneously provide said second low velocity non-penetrating spray pattern.

* * * * *